Jan. 12, 1943. O. A. HOKANSON 2,308,174
SELECTIVE ILLUMINATED DISPLAY MEANS
Filed Oct. 18, 1939 3 Sheets-Sheet 1

INVENTOR
Otto A. Hokanson,
BY
Walter P. Geyer
ATTORNEY

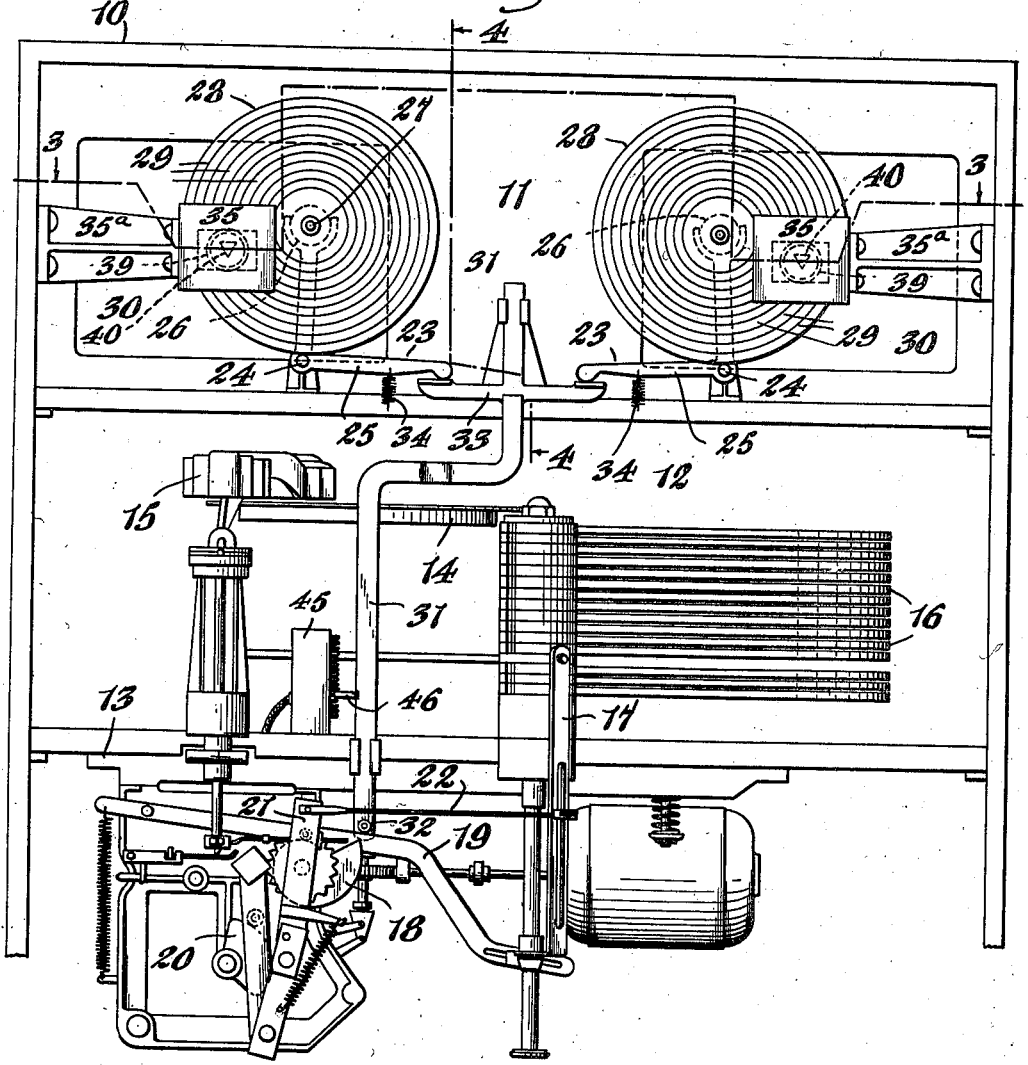

Jan. 12, 1943.   O. A. HOKANSON   2,308,174
SELECTIVE ILLUMINATED DISPLAY MEANS
Filed Oct. 18, 1939    3 Sheets-Sheet 3
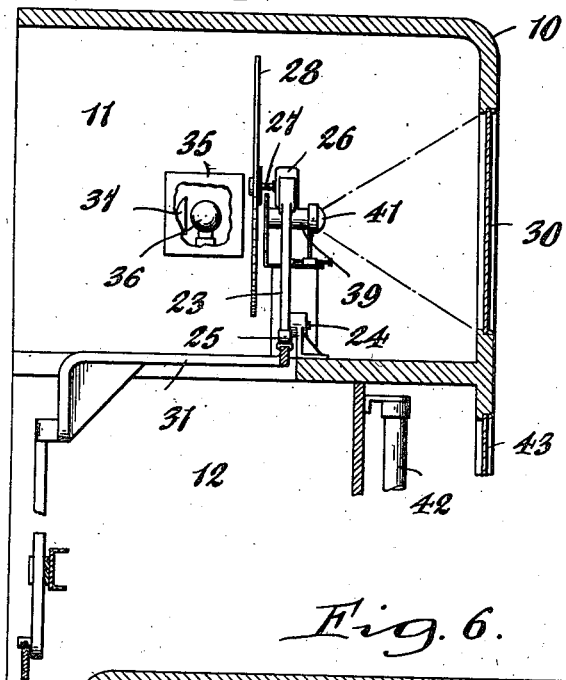
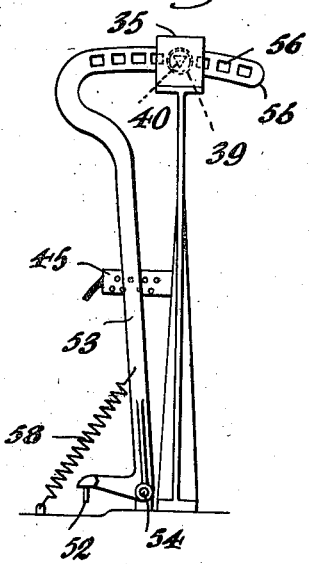
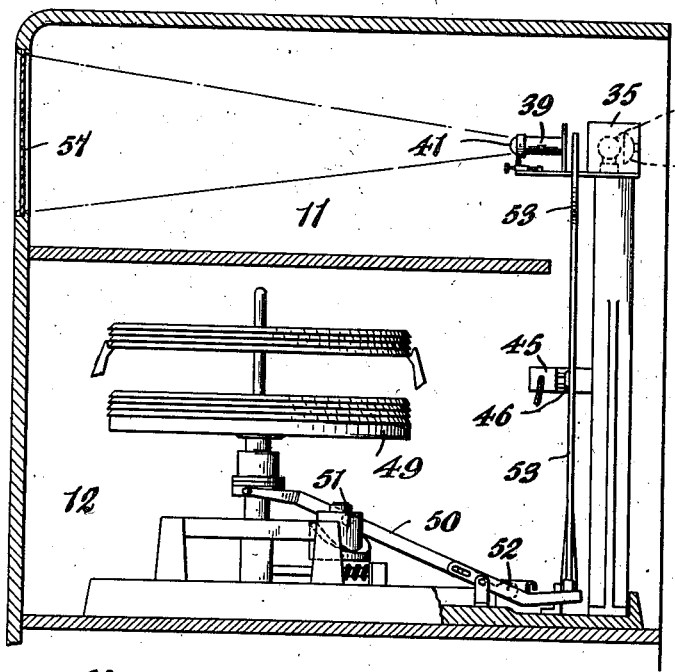
INVENTOR
Otto A. Hokanson,
BY Walter P. Geyer
ATTORNEY Patented Jan. 12, 1943

2,308,174

UNITED STATES PATENT OFFICE 2,308,174

SELECTIVE ILLUMINATED DISPLAY MEANS

Otto A. Hokanson, Snyder, N. Y., assignor to The Rudolph Wurlitzer Company, North Tonawanda, N. Y., a corporation of Ohio Application October 18, 1939, Serial No. 300,013

4 Claims. (Cl. 88—27)

This invention relates generally to illuminated color displays but more particularly to a changeable, selective color or image display for the cabinets of automatic selective phonographs and other like amusement apparatus.

It has for its primary object to provide a display of this character which is so designed and operatively associated with the selective mechanism of an automatic phonograph that with each selective projection of a record for play and during its play, and continuing thereafter, a corresponding vari-colored or monochromatic-changing design, pattern or image is displayed on a suitable screen or background provided on the cabinet.

Another object of the invention is to provide a selective and colorful illumination device for use on phonographs and the like having means adapted for operative connection to the program selective mechanism of the phonograph, whereby a different illuminated pattern, design or image is automatically produced for each record selected and played and the appearance of the phonograph enhanced accordingly, particularly when used in public places.

A further object is to provide a selective display device for attractively illuminating the cabinets of phonographs which is simple, reliable and efficient in operation, and which is designed for ready connection to automatic selective phonographs.

Other features of the invention reside in the construction and arrangement of parts hereinafter described and particularly pointed out in the appended claims.

Figure 1:
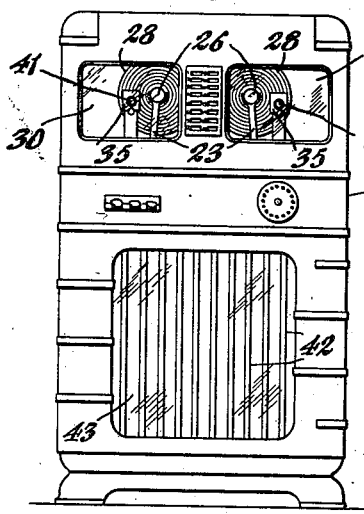
Figure 5:
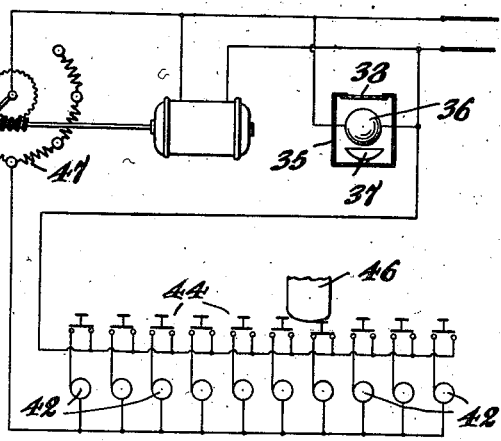
Figure 3:
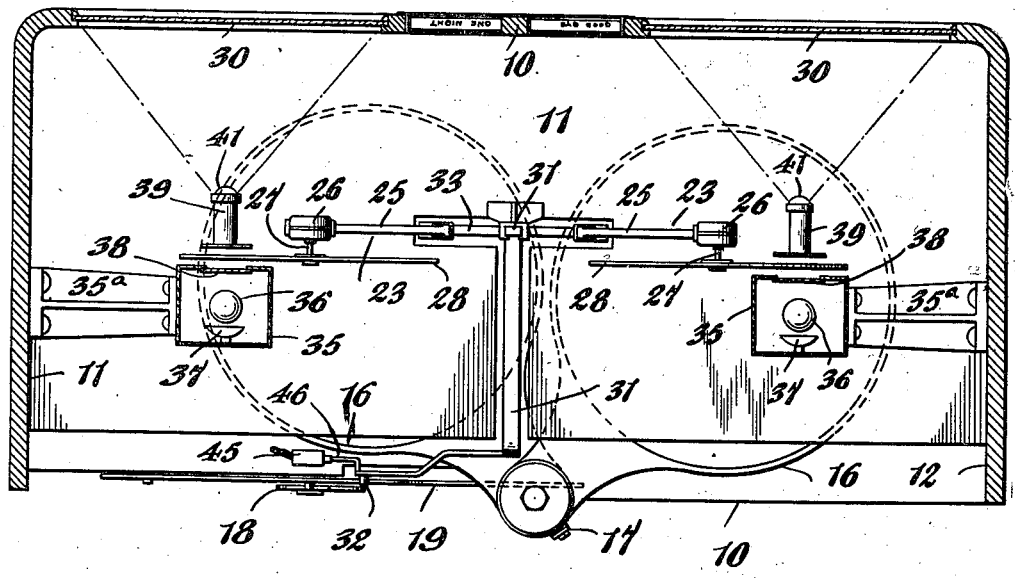

In the accompanying drawings:

Figure 1 is a front elevation of a phonograph cabinet showing my invention applied thereto. Figure 2 is an enlarged fragmentary rear view of a selective phonograph chassis and cabinet showing the selective illumination device associated therewith. Figure 3 is a horizontal section taken in the plane of line 3—3, Figure 2. Figure 4 is a fragmentary vertical section taken in the plane of line 4—4, Figure 2. Figure 5 is a wiring diagram of a circuit for controlling the dimming and brightening of the illuminated display. Figure 6 is a fragmentary vertical section of a modified form of the invention. Figure 7 is a rear elevational view of the same. Figure 8 is a horizontal section taken in the plane of line 8—8, Figure 6.

Similar characters of reference indicate corresponding parts throughout the several views.

In the embodiment of the invention shown in Figures 1-4 of the drawings, the selective illumination device has been shown in connection with a cabinet housing an automatic selective phonograph of the type shown in United States Patent No. 2,002,236, granted May 21, 1935. The numeral 10 indicates the phonograph cabinet having upper and lower compartments 11 and 12, respectively. Arranged within the lower compartment 12 is the selective record-changing mechanism consisting generally of a platform or chassis 13, a vertically movable turntable 14, a reproducer or tone arm 15 and a plurality of pivoted record-carriers 16 normally disposed in stack-like fashion at one side of the turntable and adapted to be swung horizontally to a position over the turntable, whereby the latter is elevated to pick the record from the carrier and bring it into contact with the reproducer for play, and after the playing of the record the turntable is lowered, depositing the record on its carrier, after which the latter is swung to its position in the record stack. A combined vertically-adjustable and oscillating selector yoke 17 is employed for coupling engagement with one or another of the carriers for selectively projecting them to a playing position, a selector cam 18 and lever 19 governing the vertical displacement of the yoke, while a cam 20 and actuating lever 21 and link 22 governs its swinging movements.

The selective illuminating display means for projecting a colorful design pattern or image onto a portion or portions of the phonograph cabinet or the like for rendering it attractive in appearance is adapted to be initiated and governed by the selective record-changing mechanism of the phonograph so that with each record selection a corresponding changeable display, which may be kaleidoscopic in character, is projected on a suitable screen or the like applied to the cabinet of the instrument. In its preferred embodiment, this display-creating means is constructed as follows:

Suitably arranged within the upper compartment 11 of the cabinet 10 and at opposite sides of its center are selectively actuated bell cranks 23 pivoted at 24 for vertically-swinging movement and having the lower arms 25 thereof facing each other as shown in Figure 2. The other arm of each bell crank has an electric motor 26 suitably mounted at the upper end thereof. The shaft 27 of each motor has a pattern-bearing member or disk 28 secured thereto which is preferably transparent or translucent and has imprinted thereon suitable images or designs, for example concentric bands or tracks 29 of suitable width, each bearing a different pattern of varying colors or other images suitable for providing kaleidoscopic patterns when projected on the screen 30 located at the front side of the cabinet. The selective actuation or rocking movement of the disk-carrying bell cranks 23 to different display positions is initiated from the selective phonograph mechanism, so that with each record selection, the display-creating disks are set in different selective positions. To this end, I provide an operative connection between the vertically-swinging, selectively-actuated lever 19 and the bell cranks, such connection consisting of a vertical slide bar 31 suitably guided on the cabinet and having a roller 32 at its lower end in contact with said lever, while its upper end terminates in a cross-head 33 which abuts at its ends against the undersides of the opposing bell crank arms 25. Springs 34 applied to the latter tend to urge the bell cranks in a direction to move the disks 28 toward each other. By this construction, as the lever 19 is swung to one or another of a plurality of record-selecting positions, the bell cranks are accordingly actuated to present the display-creating disks to one or another of a plurality of companion positions for producing changeable displays on the screen 30.

Operatively associated with each display disk 28 for projecting the displays onto the screen is a lamp and lens projection unit for converting the design characteristics of the disks into kaleidoscopic patterns when projected on the screen. Each of these units consists of a lamp housing 35 disposed at the rear side of the companion disk, the same being mounted on a bracket 35ª and containing an electric lamp 36 and a reflector 37 for projecting the light rays toward the disk and through a diffusing glass 38. Disposed at the opposite or front side of the disk and in the focal plane of the light-source is a lens-tube 39 containing a reflector 40 to produce the kaleidoscopic pattern effects, and a lens 41 to magnify and clearly define the images projected on the screen.

For the purpose of augmenting the color effect of the cabinet, the lower portion thereof may be provided with a plurality of colored light tubes or rods 42, which, when illuminated in any appropriate manner, project their light rays onto a screen 43. The lighting of these tubes is preferably controlled simultaneously with the selecting operation of the phonograph and to this end each tube includes in the circuit thereof a normally-open control switch 44, the several switches being preferably disposed in a vertical row in a housing 45 contained within the cabinet, as shown in Figure 2, and adapted to be selectively closed by a tappet lug 46 applied to and movable with the bell crank actuating slide bar 31.

In Figure 5 is shown the electric circuit including the disk-operating motor 26, the lamp 36 and the light tubes 42. Also included in this circuit for the purpose of effecting a gradual dimming and brightening of the tubes 42 is a variable resistance element 47 whose movable contact 48 may be driven by the drive mechanism of the phonograph or in any other suitable manner.

In the embodiment of the invention shown in the drawings, Figures 6–8, inclusive, the selective illuminating display has been shown in connection with an automatic selective phonograph of the type shown in United States Patent No. 2,096,718 granted October 26, 1937. In this type of phonograph the records are mounted in stack-like fashion on a turntable 49 which is selectively adjustable to different elevations and the stack split to provide a clearance space for the operation of the tone arm. The selective adjustment of the turntable is effected by a vertically-swinging lever 50 in operative engagement at one end with a cylindrical cam 51. Joined to the other end of this lever for actuation thereby is a rock arm 52 which in turn is disposed in operative engagement with a bell crank 53 pivoted at 54 in the upper compartment of the cabinet and terminating at its upper end in a holder 55 having pockets 56 therein for receiving matter to be projected on the screen 57. Such matter may consist of picture film or the like. A spring 58 connected to the bell crank normally maintains it in abutting contact with the rock arm 52. By this construction, as a given record is selected for play, the bell crank is actuated to a position to display a companion image on the screen in the same manner as previously described.

I claim as my invention:

1. In an illuminated display of the character described, the combination with a phonograph cabinet having a compartment for a selective record-changing mechanism including an element movable thereby to one or another of a plurality of record-playing selective positions and a second compartment having a screen upon which the display is adapted to be projected, of a source of light and lens system arranged in the second compartment, and a member pivoted for movement in a plane parallel to said screen and including an arm in selective governing engagement with said selective-positioning element and an arm projecting into said second compartment between the screen and the light and lens system and having a plurality of projectable displays thereon, said displays being disposed side by side transversely of the second compartment for selective movement into and out of the focal plane of said light-source and lens system in response to the selective movements imparted to said pivoted member by said selective-positioning element.

2. In an illuminated display of the character described, the combination with a phonograph cabinet having a compartment for a selective record-changing mechanism including an element movable thereby to one or another of a plurality of record-playing selective positions and a second compartment having a screen upon which the display is adapted to be projected, of a source of light and lens system arranged in the second compartment, and a member pivoted in said second compartment for movement in a plane parallel to its screen and having a rotating disk thereon containing a plurality of concentrically-disposed images thereon for selective registration with the focal plane of said light-source and lens system, said member having an arm thereon in operative engagement with said selective-positioning element for actuating the same to bring said images into companion selective display positions.

3. In an illuminated display of the character described, the combination with a phonograph cabinet having a selective record-changing mechanism therein including a vertically-movable element adjustable to one or another of a plurality of record-playing selective positions and a compartment having a screen upon which the display is adapted to be projected, of a source of light and lens system arranged in said compartment, a vertically-swinging bell crank pivoted in said compartment for movement in a plane parallel to its screen, one arm of said bell crank having a rotatable light-transmitting disk journaled thereon containing a plurality of concentric displays for projection on the screen and for selective registration with the focal plane of said light-source and lens system, and a slide bar disposed between said selective-positioning element and the other arm of said bell crank for governing the movements of the display-bearing disk to companion display-projecting positions.

4. An illuminated display creating device for use in connection with an amusement apparatus of the character described, comprising a light-transmitting member having a plurality of image-bearing elements disposed side by side thereon in a common plane for projection on a screen, a source of light and a lens system disposed at opposite sides of said member, a selectively-movable, bell-crank-like support for said light-transmitting member for selectively bringing one or another of its image bearing elements into the focal plane of said light-source and said lens system, a spring connected to said support for normally urging it in one direction, and a member disposed for connection at one end to said selectively-movable support and at its other end adapted for connection to an actuatable part of the amusement apparatus for actuating such member in the opposite direction and for selectively governing the positioning of its image-bearing elements for projection onto the screen.

OTTO A. HOKANSON.